United States Patent
Gu et al.

(10) Patent No.: US 9,581,124 B2
(45) Date of Patent: Feb. 28, 2017

(54) METHOD AND APPARATUS FOR DETECTING PERFORMANCE OF AN APU STARTER

(71) Applicant: Air China Limited, Beijing (CN)

(72) Inventors: Zhuping Gu, Beijing (CN); Lei Huang, Beijing (CN); Huifeng Ding, Beijing (CN); Jiaju Wu, Beijing (CN); Fengliang Zheng, Beijing (CN); Lei Zhong, Beijing (CN); Guogang Shi, Beijing (CN); Lei Chen, Beijing (CN)

(73) Assignee: Air China Limited, Beijing (CN)

( * ) Notice: Subject to any disclaimer, the term of this patent is extended or adjusted under 35 U.S.C. 154(b) by 259 days.

(21) Appl. No.: 14/338,565

(22) Filed: Jul. 23, 2014

(65) Prior Publication Data

US 2016/0230737 A1    Aug. 11, 2016

(30) Foreign Application Priority Data

Jul. 24, 2013  (CN) .......................... 2013 1 0313849

(51) Int. Cl.
*G07C 5/08* (2006.01)
*F02N 11/10* (2006.01)
(Continued)

(52) U.S. Cl.
CPC ............ *F02N 11/108* (2013.01); *B64D 41/00* (2013.01); *G05B 23/0235* (2013.01);
(Continued)

(58) Field of Classification Search
CPC ..... F02N 11/108; B64D 41/00; G07C 5/0808; G07C 5/0816; F05D 2220/50; F05D 2220/80
See application file for complete search history.

(56) References Cited

U.S. PATENT DOCUMENTS

| | | | |
|---|---|---|---|
| 2003/0149550 A1 | 8/2003 | Famili et al. | |
| 2006/0195248 A1* | 8/2006 | Kim | F01D 21/14 701/100 |

(Continued)

FOREIGN PATENT DOCUMENTS

| | | |
|---|---|---|
| CN | 102320382 A | 1/2012 |
| CN | 102866014 A | 1/2013 |

(Continued)

OTHER PUBLICATIONS

European Search report for U.S. Appl. No. 14/178,339 mailed Oct. 27, 2016, 8 pages.

*Primary Examiner* — Aaron L Troost
(74) *Attorney, Agent, or Firm* — Brundidge & Stanger, P.C.

(57) ABSTRACT

The present invention relates to a method for detecting performance of an APU starter, comprising: obtaining APU-related messages at multiple time points within one time period; obtaining running parameters of the APU starter according to the messages, the running parameters comprise starting time STA; calculating average value AVG and deviation index δ of the starting time within said time period; determining whether performance of the APU starter is in a stable phase, decline phase or failure phase according to the deviation index δ.

12 Claims, 9 Drawing Sheets

(51) Int. Cl.
*B64D 41/00* (2006.01)
*G05B 23/02* (2006.01)

(52) U.S. Cl.
CPC ......... *G07C 5/0808* (2013.01); *G07C 5/0816* (2013.01); *F05D 2220/50* (2013.01); *F05D 2260/80* (2013.01)

(56) References Cited

U.S. PATENT DOCUMENTS

2007/0260390 A1* 11/2007 Kim ................ F01D 21/00
701/100
2013/0013222 A1* 1/2013 Gu ................ F02C 9/00
702/33

FOREIGN PATENT DOCUMENTS

| | | | |
|---|---|---|---|
| EP | 2543852 | A2 | 1/2013 |
| JP | S6066647 | A | 4/1985 |
| KR | 101330804 | B1 | 11/2013 |

\* cited by examiner

APU MES/IDLE REPORT <13>

| | A/C ID | DATE UTC | FROM | TO | | FLT | |
|---|---|---|---|---|---|---|---|
| | Aircraft No. | UTC Date | Take off | landing | | Flight No. | |
| CC | BXXXX | yyyy-dd-mm xx:xx:xx | - | -- | | - | |
| | PH | CNT | CODE | BLEEDSTATUS | | APU | |
| | Leg | Count | Trigger Code | Bleed Valve Status | | APU Bleed Valve | |
| C1 | 11 | 76401 | 4000 | 16 0000 1 00000 19 | | 1 | |
| | TAT | ALT | CAS | MN | GW | CG | DMU |
| | Total Temperature | Elevation | Calculate Air Speed | Mach Speed | Total Weight | Center of Gravity | Version |
| CE | 23.3 | 150 | -- | -- | 65600 | 29.2 | I71CA2 |
| | ASN | AHRS | ACYC | PHAD | | | |
| | APU Serial No. | APU Time | APU Cycle | APU Performance Adjustment | | | |
| E1 | 2056 | 18477 | 16894 | 4000 | | | |
| | ESN | ACW1 | ACW2 | NA | EGTA | IGV | |
| | Engine Serial No. | Control Word 1 | Control Word 2 | Rotate Speed | Exhaust Gas Temperature | IGV Location | |
| N1 | 011909 | 00000 | 0A000 | 99.7 | 588 | -5 | |
| N2 | 011473 | 00000 | 0A000 | 99.8 | 580 | -5 | |
| N3 | 000000 | 00000 | 04000 | 99.8 | 388 | 82 | |
| | P2A | LCIT | WB | PT | LCDT | OTA | GLA |
| | Inlet Pressure | Load Compressor Inlet Temperature | Bleed Air Flow | Bleed Air Pressure | Load Compressor Outlet Temperature | Lubricant Temperature | APU Generator Loading |
| S1 | .956 | 33 | .41 | 3.99 | XXXX | 110 | 38 |
| S2 | .952 | 32 | .41 | 3.99 | XXXX | 110 | 27 |
| S3 | .96 | 32 | 0 | 1.17 | XXXX | 107 | 0 |
| | STA | EGIP | NPA | OTA | ICIT | | |
| | PREVIOUS APU START (APU Starting Parameters) | | | | | | |
| | Starting Time | EGT Peak Value | Peak Value EGT Rotational Speed | Lubricant Temperature | Load Compressor Inlet Temperature | | |
| V1 | 49 | 808 | 35 | 110 | 32 | | |

FIG. 5

METHOD AND APPARATUS FOR DETECTING PERFORMANCE OF AN APU STARTER

TECHNICAL FIELD

The present invention relates to a method and an apparatus for detecting performance of an aircraft component, in particular to a method and an apparatus for detecting performance of the starter of an aircraft auxiliary power unit.

BACKGROUND ART

Airborne Auxiliary Power Unit, abbreviated as APU, is a small turbine engine mounted on the tail of an aircraft. Its main function is to supply power and gas sources, with a few APUs capable of providing additive thrust to the aircraft. Specifically, before taking off from the ground, an aircraft may do not need to rely on ground power and gas source vehicles to start the aircraft as its main engine may be started via power supply from the APU. While on the ground, the APU also supplies power and compressed air to ensure lighting and air-conditioning in the cabin and cockpit. During take-off of an aircraft, the APU can serve as a backup power source. After the aircraft is landed, lighting and air-conditioning of the aircraft are still powered by the APU. The functions of APU determine that its stability directly affects flight cost and quality of service of the aircraft.

Ignition of APU is realized via a starter. The structure and cyclic process of the aircraft gas turbine engine decides that it cannot be ignited autonomously. This is because that, if fuel injection and ignition is performed directly in a static engine, the air compressor does not rotate so as to provide pressure to the air and the gas could not move backward to rotate the turbine, in which way the combustion chamber and turbine guide vane will be burnt out. Therefore, the feature for starting the gas turbine engine is: the air flows at first, and then ignition occurs, namely, the engine needs to be rotated firstly and then be started. According to the above feature, before ignition, the engine must be rotated via the starter by consuming electric power.

The starting of an APU is the process of accelerating the APU rotator from a static state to a stable working state, namely, the working process for the APU rotator to accelerate its rotation speed from 0 to over 95%. During this process, whether the APU rotator may reach a required working rotation speed within a prescribed time and enters into a stable working state mainly depends on the torque the APU rotator obtains during the starting process. As the service time of the starter increases, its efficiency reduces gradually due to the decrease of contact of the carbon brush or increase of internal friction caused by internal field deformation, increasing loss of copper and iron, mechanical wear and the like, and the output power reduces accordingly. When the output power of the starter reduces to a certain degree, the starter cannot provide the APU rotator with an adequate torque, namely failure of the starter occurs.

APU starter is an important component of APU. Once the starter fails, it will directly cause the APU unable to start, and thus cause the aircraft unable to fly. According to statistics, failure of starter occupies nearly half of the total amount malfunctions of APU, and is a main cause affecting normal operation of APU. It is also a main problem that needs to be solved so as to improve maintenance of APU. Currently, there is not any effective way to maintain the APU starter except for breakdown maintenance. In addition, since performance of the starter deteriorates at a rapid speed (generally speaking, the time for a starter from entering into decline phase to the occurrence of malfunction is basically within 30 hours of flight), there is a need to react to the deterioration of performance of the APU starter rapidly so as to save time to prepare a standby component, which is very important for ensuring on-schedule operation of an aircraft. Meanwhile, it will help to control inventory more accurately, or even realize zero inventory.

SUMMARY

For the above technical problem existing in the prior art, there is provided, according to one aspect of the present invention, a method for detecting an APU starter, comprising: obtaining APU-related messages at multiple time points within a time period; obtaining running parameters of the APU starter according to the messages, the running parameters comprising starting time STA; calculating average value AVG and deviation index $\delta$ of the starting time STA within said time period; determining whether performance of the APU starter is in a stable phase, decline phase or failure phase according to the deviation index $\delta$.

For the method described above, wherein the step for determining whether performance of the APU starter is in a stable phase, decline phase or failure phase comprises: in response to that the deviation index $\delta$ is smaller than the decline threshold value, determining that performance of the APU starter is in a stable phase; in response to that the deviation index $\delta$ is larger than the decline threshold value and smaller than the failure threshold value, determining that performance of the APU starter is in a decline phase; and in response to that the deviation index $\delta$ is larger than the failure threshold value, determining that performance of the APU starter is in a failure phase.

The method as described above further comprises: determining the deviation index $\delta$ when performance of the APU starter is in a stable phase; wherein the decline threshold value is around 1.5 to 2.0 times of the stable deviation index $\delta$, and the failure threshold value is around 2 to 3 times of the stable deviation index $\delta$.

The method as described above, wherein the time period is about 2 to 3 days.

The method as described above, wherein about 5 to 10 APU-related messages are obtained within said time period.

The method as described above further comprises: determining starting time $STA_{next}$ obtained according to a next APU-related message; in response to that $STA_{next}$ is larger than $AVG+n\delta$, determining whether $STA_{next+1}$ obtained according to a next APU-related message is larger than $AVG+n\delta$; and in response to that the number of times for starting time STA obtained according to APU-related message continuously larger than $AVG+n\delta$ exceeds the preset warning number Z, sending out warnings; wherein, n is 2 to 5; and Z is 3 to 5.

The method as described above, in response to that the starting time STA obtained according to APU-related message is smaller than $AVG+n\delta$, recalculating average value AVG and deviation index $\delta$ of the starting time STA.

The method as described above, in response to that the number of times for starting time STA obtained according to APU-related message continuously larger than $AVG+n\delta$ exceeds the preset warning number Z, recalculating average value AVG and deviation index $\delta$ of the starting time STA.

The method as described above, wherein the deviation index $\delta$ is standard deviation.

The method as described above, wherein the n is 2 or 3, and Z is 3.

The method as described above further comprises: determining that fuel unit of APU works in normal condition.

The method as described above further comprises: determining that other parameters of APU keep normal, said other parameters comprise but are not limited to: APU exhaust gas temperature EGT, bleed air pressure PT, angle of inlet guide vane IGV and APU turbine efficiency NPA.

According to another aspect of the present invention, there is provided an apparatus for detecting performance of an APU starter, comprising: message acquisition unit, which obtains APU-related messages in a time period; message parsing unit, which parses out the required running data of the APU starter; and performance detection unit, which determines whether performance of the APU starter is in a stable phase, decline phase, serious decline phase or failure phase according to the running data of the starter.

According to still another aspect of the present invention, there is provided an apparatus for detecting performance of an APU starter, comprising a processor; and a storage connected to the processor, wherein the storage stores computer readable codes; the computer readable codes run on the processor so as to execute the following steps: obtaining APU-related messages in a time period; parsing out the running parameters of the APU starter according to the messages, the running parameters comprising starting time STA; determining whether performance of the APU starter is in a stable phase, decline phase, serious decline phase or failure phase.

DESCRIPTION OF DRAWINGS

Hereinafter, preferred embodiments of the present invention will be further described with reference to the accompany drawings, wherein:

FIG. 5 is an example of A13 message of Airbus;

MODE OF INVENTION

Figure 1:
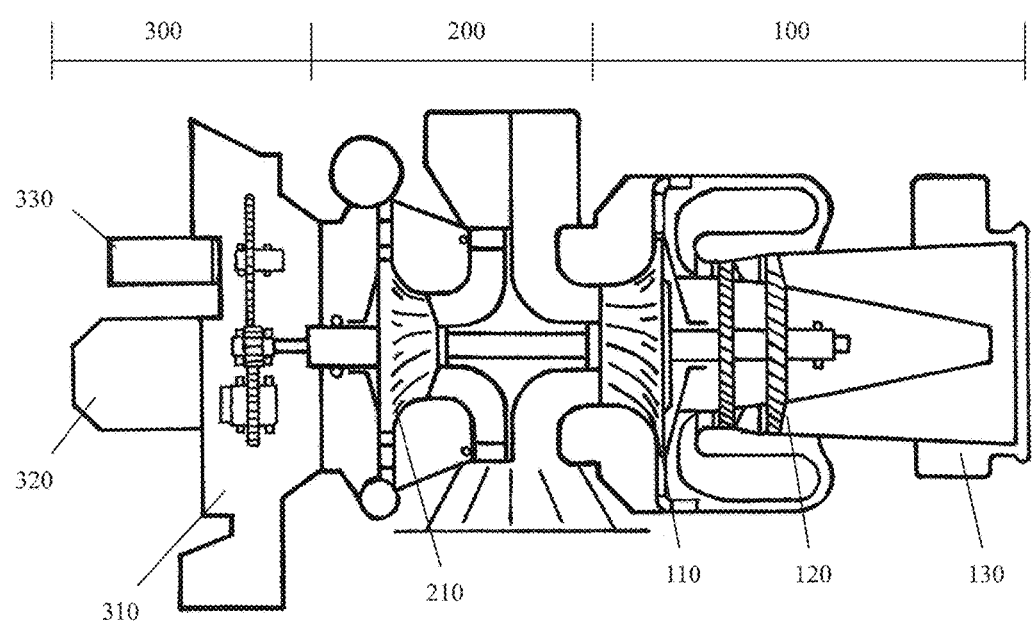
FIG. 1 is a schematic illustrating the structure of an aircraft APU according to one embodiment of the present invention.

Hereinafter, in order to give a clearer picture of the purposes, technical solutions and advantages of the embodiments of the present invention, the technical solutions in the embodiments of the present invention will be further described, taken in conjunction with the accompanying drawings in the embodiments of the present invention. Apparently, the described embodiments are only a part of the embodiments rather than all embodiments of the present invention. Based on the embodiments in the present invention, all other embodiments a person with ordinary skill in the art achieves without any creative effort shall fall within the protection scope of the present invention.

In the following detailed description, reference is made to the accompanying drawings, which form a part of the present application to illustrate specific embodiments of the application. In the drawings, similar symbols in different drawings identify substantially similar components. With the following detailed description about each specific embodiment of the present application, an ordinary person with relevant knowledge and technology in the art will be able to implement technical solutions of the present application. It should be appreciated that other embodiments may be utilized or changes in structure, logic or electrical property may be made to the embodiments of the present application.

FIG. 1 is a schematic illustrating the structure of an aircraft APU according to one embodiment of the present invention. As shown in the figure, the aircraft APU mainly comprises a power portion 100, a load portion 200, and an accessory portion 300, wherein, the power portion 100 mainly comprises a power compressor 110, a turbine assembly 120, an exhaust assembly 130 and so forth; the load portion 200 mainly comprises a load compressor 210; the accessory portion 300 mainly comprises an accessory gearbox 310, a starter 320 and an electrical generator 330 and so forth. Input air flow from the air inlet diverges into two streams, with one entering the power compressor 110 and turbine assembly 120 mainly for rotating the APU and then flowing out via the exhaust assembly 130, while another stream entering the load compressor 210 to be pressurized by the load compressor to generate a compressed air exclusively for the use of an aircraft. At the entrance of the airflow, there is provided with a flow regulating valve (inlet guide vane) to regulate opening degree of the valve (vane) in a real-time manner according to compressed air needed by an aircraft so as to control air flow into the load compressor.

Figure 2:
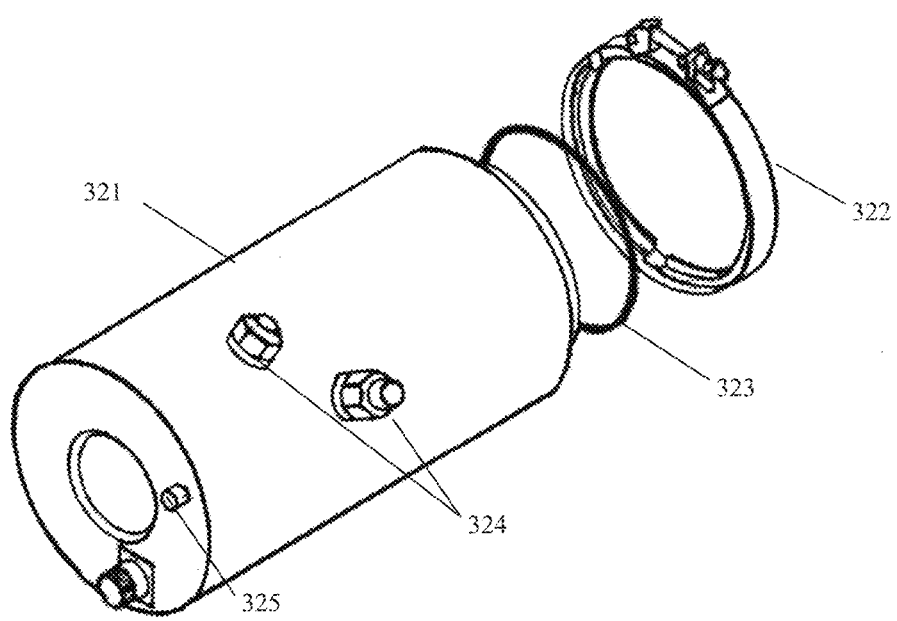
FIG. 2 is a schematic illustrating the structure of an aircraft APU starter according to one embodiment of the present invention.

FIG. 2 is a schematic illustrating an APU starter according to one embodiment of the present invention. The main portion of the starter 320 is a direct current motor assembly 321, which is coupled to the accessory gearbox 310 via a clamp 322 in a "V" shape and a loop 323 in a "O" shape. On the direct current motor assembly 321, there is provided with direct current power connecting posts 324 and electrical brush wear indicator 325. Generally speaking, one of the two power connecting posts 324 is connected to a direct current of 28 V and the other to the ground. In the electrical brush wear indicator 325, there is set a pin visible in a plastic housing. When the indicator pin is displayed, the electrical brush is fine; when the indicator pin is not shown, it is necessary to replace the electrical brush part of the starter.

According to one embodiment of the present invention, the starter system obtains power from the direct current system of the aircraft, supplies a direct current voltage of 28 V to the battery bus (BAT BUS), and the direct current voltage is further supplied to the starter via a contactor. The starter system rotates and accelerates the APU rotor to a rotational speed such that the fuel and ignition system may work, and then ignites the fuel to further accelerate the APU. When the rotational speed reaches 35% to 60% of the normal rotational speed of APU, the starter is shut while the APU continues to accelerate to a normal working rotational speed. For example, for APU of APS3200, when the rotational speed reaches 55% of the normal rotational speed of APU, the starter is shut off; while for APU of GTCP131-9A, when the rotational speed reaches 50% of normal rotational speed of APU, the starter is shut off.

Figure 3:
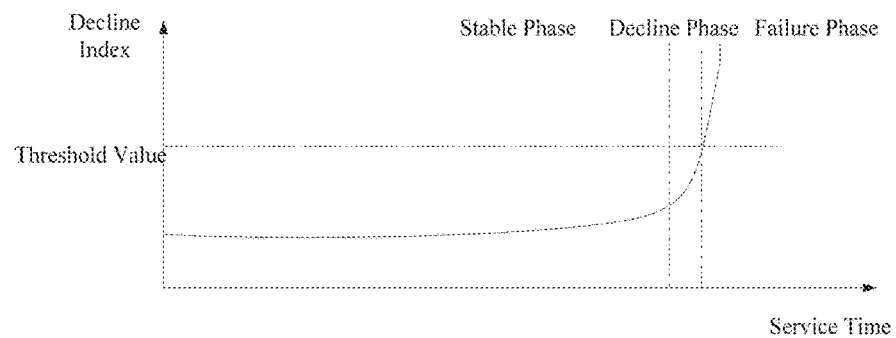
FIG. 3 is a graph showing a curve reflecting changes of performance of an APU starter according to one embodiment of the present invention.

Changes of performance of a starter follow certain rules: during the early and middle phases of the use of a starter, the performance of the starter is relative stable, while during the later phase, its performance will deteriorate until breakdown. FIG. 3 is a schematic showing a curve reflecting changes of performance of an APU starter. As can be seen from the figure, as the service time increases, the decline index continues to increase as performance of the APU starter declines gradually. When the decline index of the performance of the APU starter is relatively stable, its performance is in the stable phase; when the decline of performance of the APU starter accelerates, it performance enters the decline phase; when the decline index exceeds a certain threshold value, performance of the APU starter enters the failure phase during which malfunction might occur at any time. After the APU starter enters the failure phase, it will not only affect the use of APU and have adverse effect on quality of service and flight safety, but also cause unplanned maintenance and flight delay and grounding.

Figure 4:
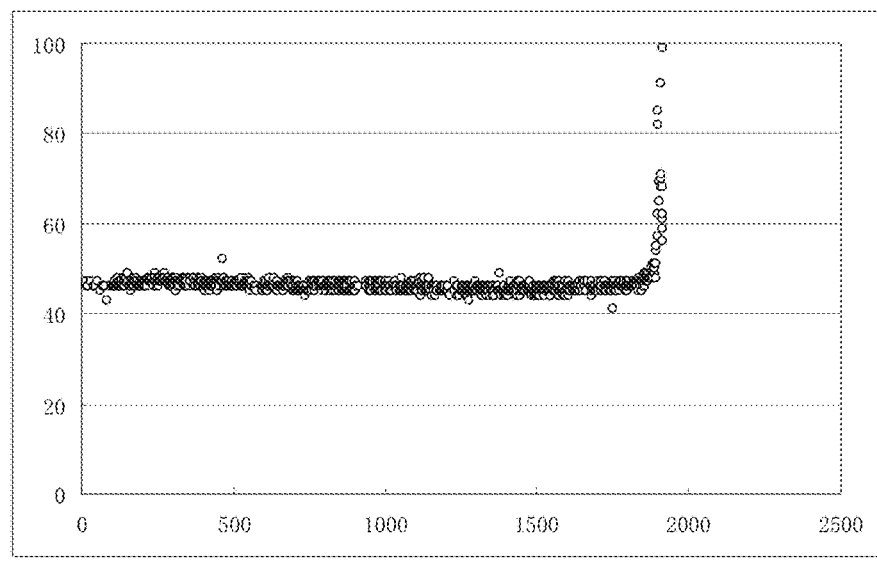
FIG. 4 is a statistical tendency diagram of data of the starting time of an APU starter.

Performance of an aircraft APU starter is mainly represented by start time of APU. FIG. 4 is a statistical tendency diagram reflecting changes of the APU starting time caused by changes of performance of the APU starter. As shown in FIG. 4, when the starter is in the stable phase, starting time of the APU changes in a very small scope, however when the APU starter is in the decline phase, starting time of the APU leaps upwardly until the APU cannot be started due to malfunction. In addition, as can be seen from FIG. 4, the time from the entry into the decline phase to the occurrence of malfunction is very short. Therefore, the detection of decline phase of a starter becomes extremely important.

In prior art, there is no means for detecting whether the performance of an APU starter is in a decline phase. However, some embodiments of the present invention may realize such detection. The detection of decline phase has the following merits: when an APU starter is in the decline phase, the probability of malfunction remains very low. If the aircraft is maintained at this time, flight safety and quality of service can be guaranteed. At that time, the airline company may arrange inspection and maintenance of the aircraft at an appropriate time so as to avoid unplanned maintenance and reduce flight delay. Meanwhile, excessive costs for maintenance at a regular interval can be avoided.

Multiple methods can be utilized to obtain the running parameter STA (starting time). For example, the above data can be obtained from data stored in the black box of an aircraft.

The above data can also be obtained from the data system provided by the aircraft manufacturer, and real-time detection on the ground can be realized. For example, running data of an aircraft can be monitored in a real-time manner via both Aircraft Condition Monitoring System (ACMS) of Airbus and Aircraft Heath Monitor (AHM) system of Boeing. Besides, when certain trigger condition is met, a message containing a series of data information can be generated automatically.

According to one embodiment of the present invention, APU-related running data can be obtained via the aircraft data system (such as ACMS or AHM systems) and be embodied in the related generated message. Such message information can be transmitted to the ground via the Aircraft Communication Addressing and Reporting System (ACARS) and further be distributed to servers of different airline companies. According to one embodiment of the present invention, the APU message may also be transmitted via the communication apparatus or system of Aviation Telecommunication Network (ATN).

In fact, for those existing flight data systems, monitoring the performance of APU is an already-included item, and thus a corresponding APU message can be generated automatically and transmitted to the ground via ACARS or ATN. However, those data monitored are not utilized for detecting the decline phase of performance of APU. For example, the A13 message of Airbus (namely, APU MES/IDLE REPORT) or the APU message of Boeing is an example of such APU message. In the following embodiment, the A13 message of Airbus is illustrated as an example. APU message of Boeing is processed in a similar way.

FIG. 5 illustrates an example of A13 message of Airbus. As shown in the figure, the A13 message mainly contains the following 4 parts of information: the header, the APU history information, the running parameters of starting the aircraft engine and the APU starting parameters.

The header is composed of CC section and C1 section, mainly including information such as flight information of aircraft, leg in which the message is generated, bleed valve status, total air temperature (i.e., external temperature), and so on. The APU history information is comprised of E1 section including APU serial number, service time and circulation and so forth. The running parameters for starting an aircraft engine is comprised of N1 to S3 sections; wherein N1 and S1 indicate the running status when the first aircraft engine is started; N2 and S2 indicate the running status when the second aircraft engine is started; N3 and S3 is the status after all engines are started and the APU is idling; wherein data relating to performance of the starter is starting time STA.

As can be seen from FIG. 5, starting time STA, the APU running parameter, is included in the existing A13 message. Therefore, the detection of performance of the APU starter of the present invention can be realized by utilizing data obtained in this message.

Figure 6:
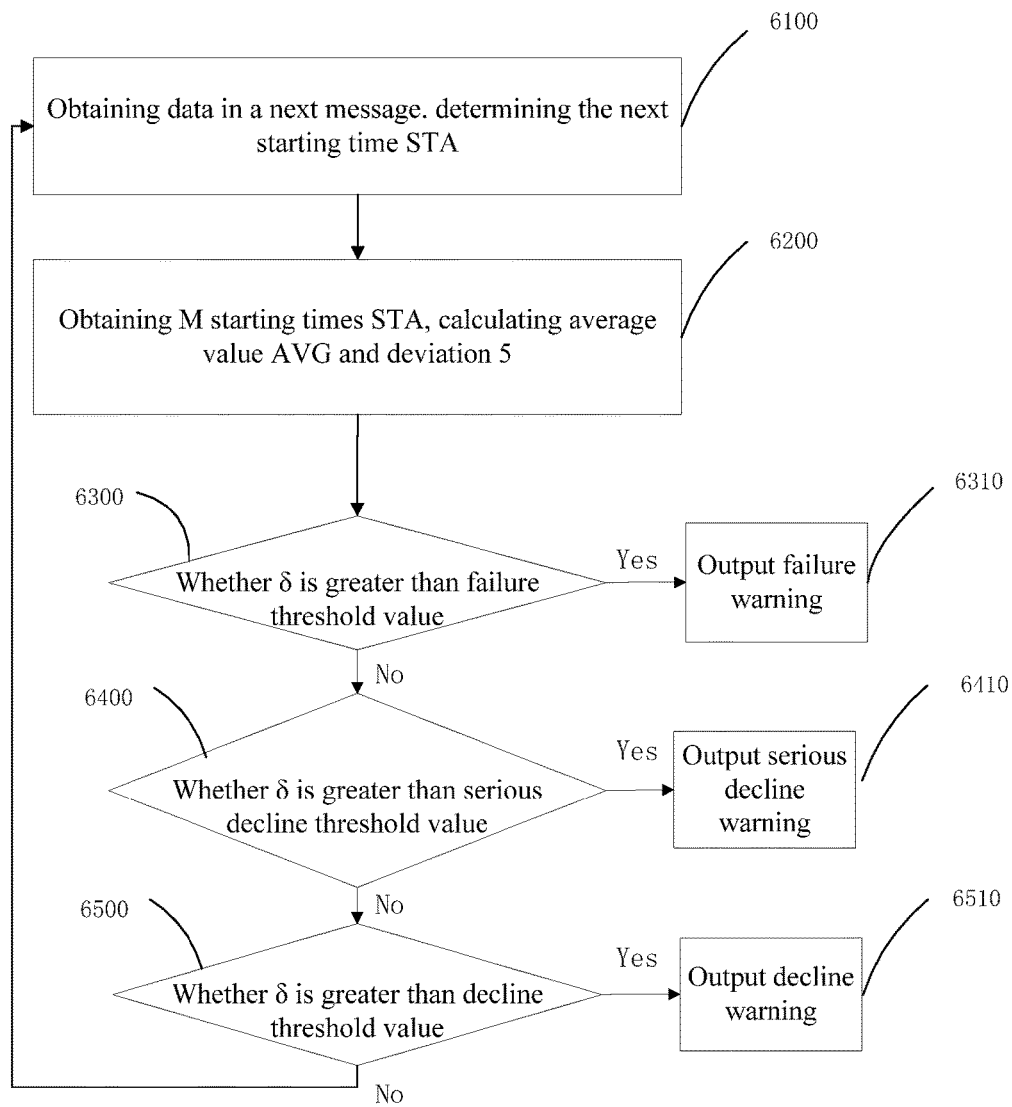
FIG. 6 is a flow chart illustrating a method for detecting performance of an APU starter according to one embodiment of the present invention.

FIG. 6 is a flow chart illustrating a method for detecting performance of an APU starter according to one embodiment of the present invention. As shown in this figure, in method 6000 for detecting performance of the APU starter, in step 6100, running data such as starting time STA of an APU starter at a certain time point is obtained.

According to one embodiment of the present invention, information needed in step 6100 can be obtained from an APU message such as the A13 message. For example, the A13 message of the running of an aircraft APU can be remotely obtained in a real-time manner from SITA (Société Internationale de Télécommunications Aéronautiques) network control center and ADCC (Aviation Data Communication Corporation) network control center, and the obtained A13 message of APU running status can be decoded via a message decoder so as to obtain the required running information of the starter for the Aircraft APU.

In step 6200, the previous M starting times STA are obtained, and their average value AVG and standard deviation δ are calculated. According one embodiment of the present invention, the value of M may be 20.

In step 6300, compare whether the standard deviation δ calculated in the previous step exceeds failure threshold value. If yes, then in step 6310, output failure warning.

If the result of the comparison in step 6300 is NO, then go to step 6400, and compare whether the standard deviation δ calculated in step 6200 exceeds the serious decline threshold value. If yes, then in step 6410, output serious decline warning.

If the result of the comparison in step 6400 is NO, then go to step 6500, and compare whether the standard deviation δ calculated in step 6200 exceeds the decline threshold value. If yes, then in step 6510, output decline warning.

According to one embodiment of the present invention, fluctuation of the APU starter of this type in the stable phase is analyzed based on historical data, and other threshold values are further determined based on the volatility in the stable phase. For example, according to one embodiment of the present invention, the decline threshold value is 1.5 to 2.0 times of the fluctuation in the stable phase, and the failure threshold value is 2 to 3 times of the fluctuation in the stable phase.

Such method for utilizing data keeping updated in a certain period of time to analyze changes of trend is referred to as moving window method. The size of the moving window, namely the number M of the points included in the calculation, depends on a number of factors, such as time interval between different measurements and control strategy and so forth. The smaller the moving window is, the easier the volatility of data will be affected by normal fluctuation, and thus various misinformation will occur, which will affect the technical effect of the present invention. If the moving window is overlarge, although the trend of changes will be reflected more accurately, the timeliness of the present invention will be reduced and warning information cannot be delivered timely. Therefore, the size of the moving window plays an important role in the present invention. According to one embodiment of the present invention, the value of M is around 5 on the condition that 2 to 3 points are measured in each day. According to another embodiment of the present invention, the value of M is around 10 on the condition that the number of points measured in each day is less than or equals to 2.

According to one embodiment of the present invention, in order to reduce false alarm and improve accuracy, the performance of an APU starter is determined to be in the decline phase only if two consecutive decline warnings occurred; while the performance of the APU starter is determined to be in the failure phase only when more than 2 consecutive failure warnings occurred.

Figure 7:
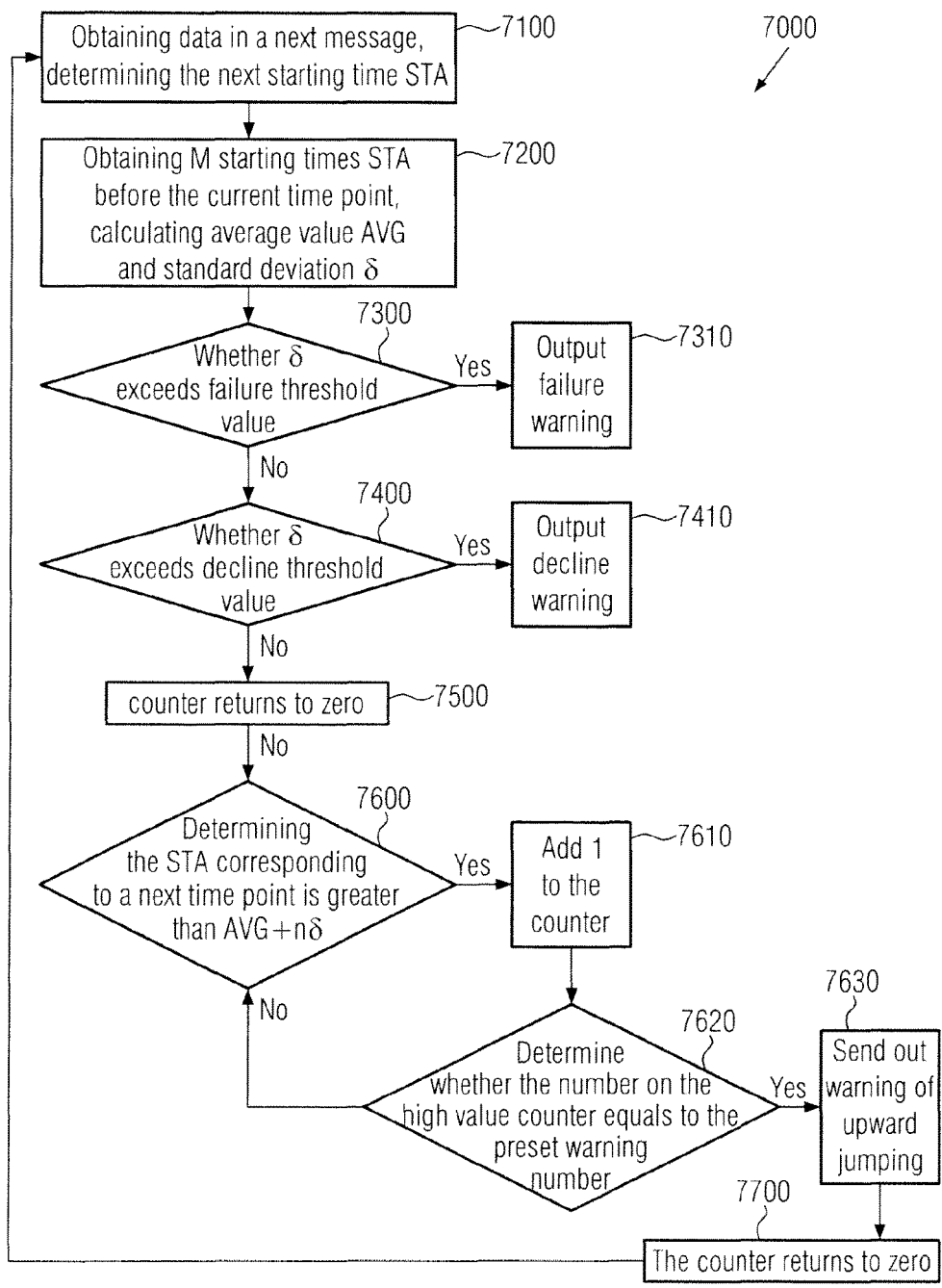
FIG. 7 is a flow chart illustrating a method for detecting performance of an APU starter according to another embodiment of the present invention.

FIG. 7 is a flow chart illustrating a method for detecting performance of an APU starter according to another embodiment of the present invention. As shown in this figure, in the method 7000 for detecting performance of the APU starter, similar to the embodiment illustrated in FIG. 6, in step 7100, running data such as starting time STA of an APU starter of an aircraft in a certain service time are obtained.

In step 7200, M starting times STAs before the current time point are obtained and their average value AVG and standard deviation δ are calculated. The reason for calculating average value and standard deviation of a certain number of previous points is to set a range of fluctuation for the judgment of the next point, however it is necessary to eliminate values that might be noise. According to the following description, high value counter is utilized to record deviation points exceeding the preset range, and when the number of deviation points that consecutively occurred does not reach the warning number, those deviation points will not be included into the sample for calculation of average value and standard deviation. According to one embodiment of the present invention, the value of M may be 20.

In step 7300, compare whether the standard deviation δ calculated in the previous step exceeds the failure threshold value. If yes, then in step 7310, output failure warning.

When the judgment in step 7300 is NO, then go to step 740, compare whether the standard deviation δ calculated in step 7200 exceeds the decline threshold value. If yes, then in step 7410, output decline warning.

When the judgment in step 7400 is NO, then go to step 7500, the counter returns to zero. This is because the counting of deviation points is interrupted according to the previous judgment, and it is necessary to return the counter to zero so as to recount the number of consecutive deviation points.

In step 7600, determine whether the starting time STA corresponding to the next time point exceeds AVG+nδ. Wherein, the value of n depends on control strategy. When the value of n is relatively high, the control on breakpoint is relatively loose, which may reduce misinformation but has the risk of missing the failure; while when the value of n is relatively low, the control on breakpoint is relatively strict, which may prevent the failure but may generate warnings with high frequency. Generally speaking, the value of n is between 2 to 5. According to one embodiment of the present invention, the value of n is 3.

When the judgment in step 7600 is YES, then go to step 7610, add 1 to the counter. Next, in step 7620, determine whether the number on the high value counter equals to the preset warning number. When the determination is NO, return to step 7600. When the determination is YES, it means that some consecutive starting times STAs, the number of which reach the preset warning number, exceed the preset normal range of fluctuation and jump upwardly, then go to step 7630, and send out warning of upward jumping.

When the judgement in step 7600 is No, return to step 7100. It means that the starting time STA is within the normal range and no warning is necessary.

According to one embodiment of the present invention, since a single jump might be resulted from various causes, it is required that the warning is output only if the number of jumps consecutively exceeds a certain amount so as to avoid misinformation. The value of preset warning number is related to the control strategy, its value is 2 to 5 in general.

In step 7700, the high value counter is returned to zero. This is because when the number of consecutive deviation points reaches the preset warning number, the occurrence of deviation points is not accidental and shall not be eliminated as noise. To return the counter to zero at this time, those deviation points will be retained so as to be included into the reference sample for calculation when recycled to step 7200 next time. Then, return to step 7100 after this step ends.

Figure 8A:
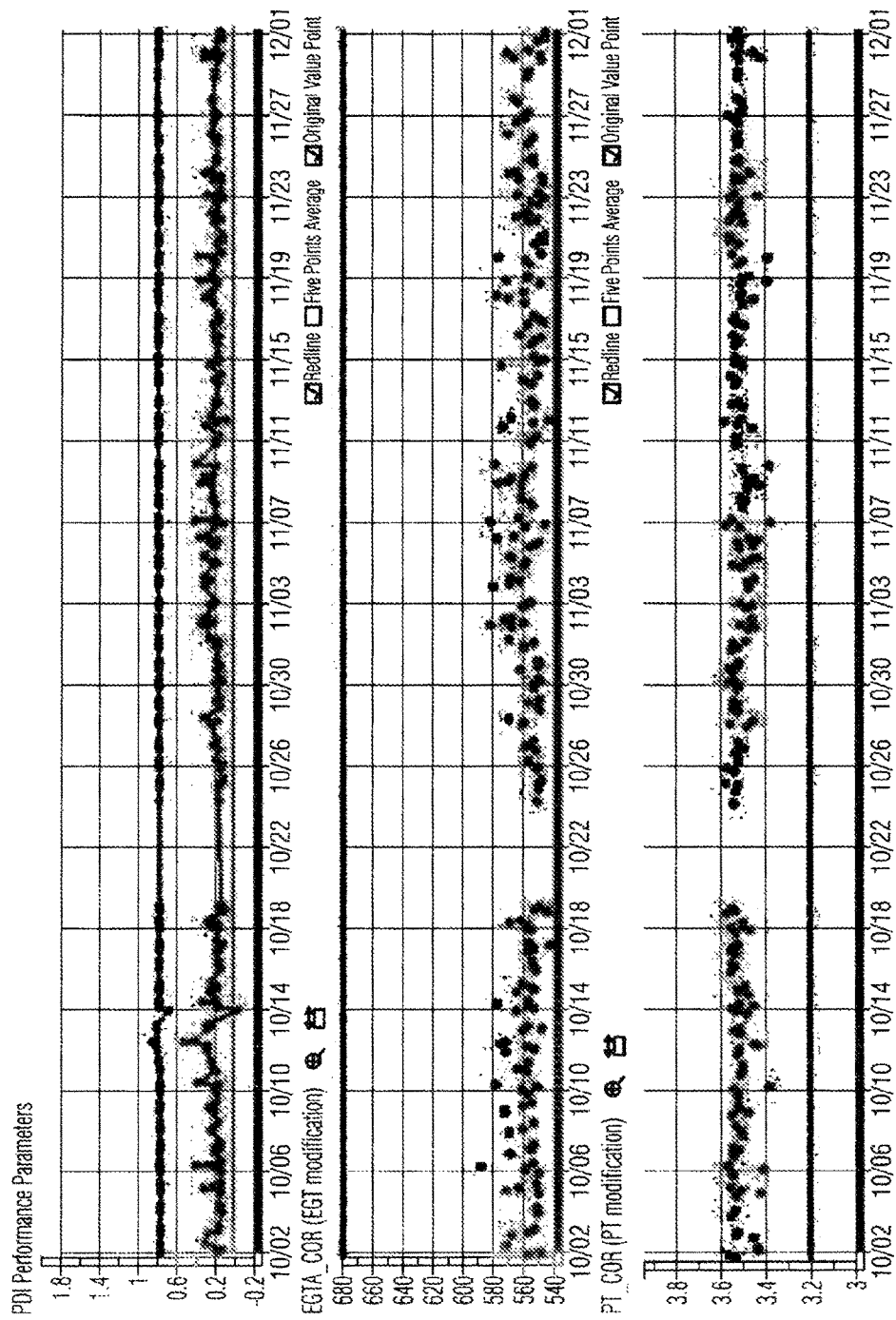
FIGS. 8A-8B are examples of changes of performance of an APU starter according to one embodiment of the present invention.
Figure 8B:
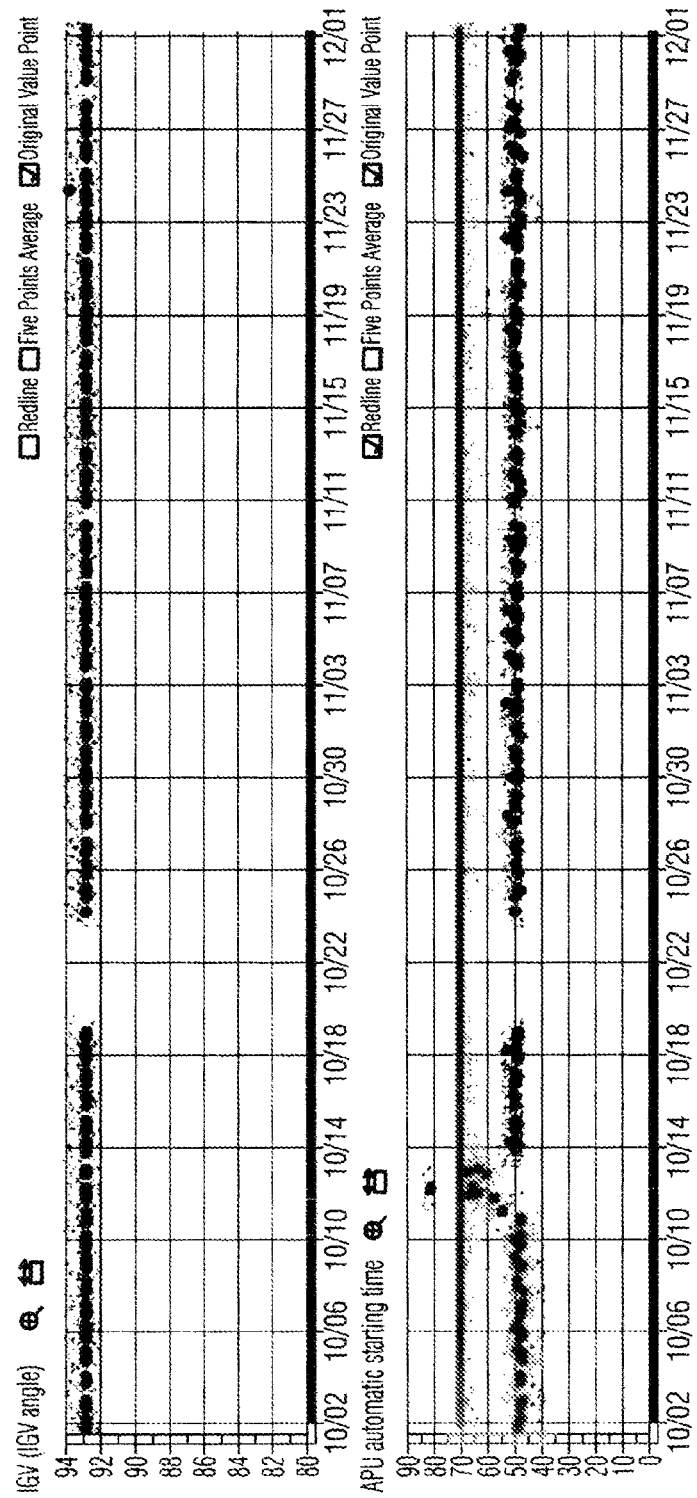

FIGS. 8A-8B are examples of changes of performance of an APU starter according to one embodiment of the present invention. At the position marked by solid line in the figure, the APU starter is replaced. As shown in FIG. 8B, before the replacement of the APU starter, the starting time STA increases rapidly. If using the method descried above, one will find a rapid increase of STA along with a quick increase of deviation index such as standard deviation, and thus a warning of the deterioration of performance of the APU starter and its entry into decline phase will be generated rapidly.

Meanwhile, it shall also be noted that other parameters of APU except for the starting time STA keep normal, therein the said other parameters comprise but are not limited to: APU exhaust gas temperature EGT, bleed air pressure PT, angle of inlet guide vane IGV, all of which are within the normal range. This is an important feature of the failure of APU starter.

It shall also be noted that the deterioration of performance of the APU fuel unit FCU is also similar to the above. Therefore, it shall be distinguished from the failure of fuel control unit: at first, for the standard deviation dispersion of the starting time STA, when the performance of APU fuel unit FCU deteriorates, the speed of deterioration of STA is slow however the performance of STA is good at one time and bad at another, therefore, the area of the dispersion is larger; while during the failure of the starter, it is always the case that STA goes up unilaterally and more rapidly. Besides, although performance of APU fuel unit FCT deteriorates, other parameters except for STA keep good; however, NPA and EGTP will also gradually deteriorate due to unsteady supply of fuel.

Figure 9:
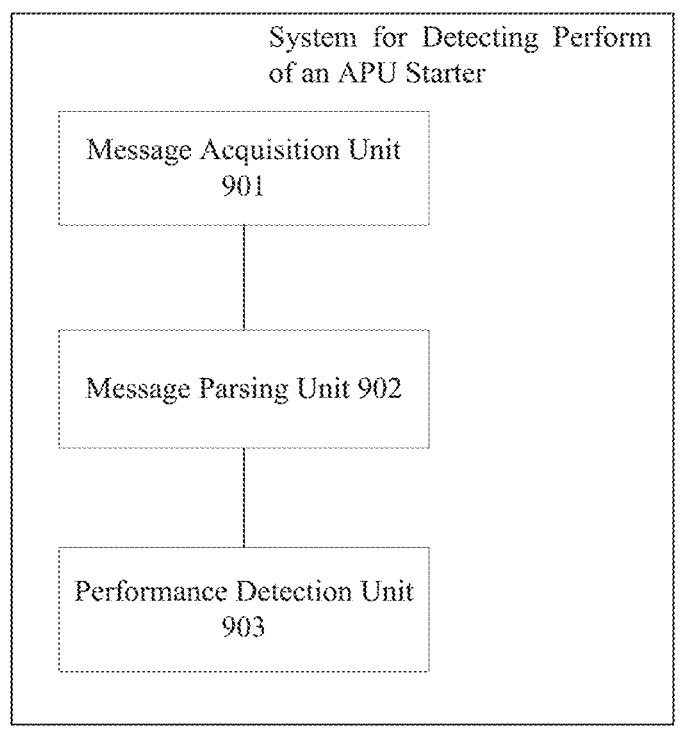
FIG. 9 is a schematic illustrating the structure of a system for detecting performance of an APU starter according to one embodiment of the present invention.

FIG. 9 is a schematic of the structure of a system for detecting performance of a starter of APU according to one embodiment of the present invention. As shown in FIG. 9, the system for detecting perform of an APU starter comprises: message acquisition unit 901, which obtains message relating to APU within a time period; message parsing unit 902, which parses out the required running data of the APU starter; and performance detection unit 903, which determines whether the performance of the APU starter is in a stable phase, decline phase, serious decline phase or failure phase according to the running data of the starter.

According to one embodiment of the present invention, an apparatus for detecting performance of an APU starter of an aircraft comprises: a processor; and a storage coupled to the processor, wherein the storage stores computer readable instructions; the computer readable instructions run on the processor so as to execute the following steps: obtaining the APU-related messages in a time period; parsing out running parameters of the APU starter according to the message, the running parameters comprise starting time STA; determining whether the performance of the APU starter is in a stable phase, decline phase, serious decline phase or failure phase.

The above embodiments are only described for illustrating the present invention, and do not mean to limit the present invention. A person with ordinary skill in relevant art may make various changes and variations without departing from the scope of the present invention. Therefore, all equivalent technical solutions shall also fall within the disclosure of the present invention.

We claim:

1. A method for detecting performance of an Airborn Auxiliary Power Unit (APU) starter, comprising:
    rotating the APU with a starter system;
    obtaining APU-related messages at multiple time points within one time period;
    obtaining running parameters of the APU starter according to the messages, the running parameters comprise starting times (STAs);
    calculating average value AVG and deviation index δ of the STAs within said time period;
    determining whether performance of the APU starter is in a stable phase, decline phase, or failure phase according to the deviation index δ, the determining comprising:
        in response to that the deviation index δ is less than a decline threshold value, determining that performance of the APU starter is in a stable phase,
        in response to that the deviation index δ is greater than the decline threshold value and smaller than a failure threshold value, determining that performance of the APU starter is in a decline phase, and
        in response to that the deviation index δ is greater than the failure threshold value, determining that performance of the APU starter is in the failure phase; and
    determining the deviation index δ when the APU starter is in a stable phase,
    wherein, the decline threshold value is about 1.5 to 2.0 times of the stable deviation index δ, and failure threshold value is about 2 to 3 times of the stable deviation index δ.

2. The method of claim 1, wherein the time period is between 2 and 3 days.

3. The method of claim 1, wherein around 5 to 10 APU-related messages are obtained within the time period.

4. The method of claim 1, further comprising:
    determining an STA for an immediately subsequent APU-related message;
    in response to that the next STA is greater than AVG+nδ, determining whether STA+1 obtained from a next APU-related message is greater than AVG+nδ; and
    in response to that the number of times for the STA obtained according to APU-related message is continuously greater than AVG+nδ exceeds preset warning number Z, sending out a warning,
    wherein, n is a value from 2 to 5 and Z is a value from 3 to 5.

5. The method of claim 4, in response to the starting time STA obtained according to APU-related messages is less than AVG+nδ, recalculating an average value AVG and deviation index δ of the STA.

6. The method of claim 4, in response to that the number of times for starting time STA obtained according to APU-related message continuously greater than AVG+nδ exceeding the preset warning number Z, recalculating an average value AVG and deviation index δ of the STA.

7. The method of claim 4, wherein n is 2 or 3, and Z is 3.

8. The method of claim 1, wherein the deviation index δ is a standard deviation.

9. The method of claim 1, further comprising:
    determining that fuel unit of APU works in normal conditions.

10. The method of claim 1, further comprising:
    determining that other parameters of APU remain normal, the other parameters comprising:
        APU exhaust gas temperature EGT, bleed air pressure PT, angle of inlet guide vane IGV and APU turbine efficiency NPA.

11. An apparatus for detecting performance of an APU starter, comprises a processor and a memory for storing computer readable instructions for instructing the processor implementing the following units:
    a rotating unit configured to rotate the APU with a starter system;
    a message acquisition unit, configured to obtain APU-related messages within a predetermined time period;
    a message parsing unit configured to parse out running parameters of APU starter according to the APU-related messages, the running parameters comprising starting times (STAs) within the predetermined time period; and
    a performance detection unit, configured to determine whether performance of the APU starter is in a stable phase, decline phase, serious decline phase or failure phase according to the STAs within the predetermined time period by:
        in response to that the deviation index δ of the STAs within the predetermined time period is less than a decline threshold value, determining that performance of the APU starter is in a stable phase,
in response to that the deviation index δ of the STAs within the predetermined time period is greater than the decline threshold value and less than a failure threshold value, determining that performance of the APU starter is in a decline phase, and
in response to that the deviation index δ of the STAs within the predetermined time period is greater than the failure threshold value, determining that performance of the APU starter is in the failure phase,
wherein, performance detection unit is configured to determine the deviation index δ when the APU starter is in a stable phase; and
the decline threshold value is about 1.5 to 2.0 times of the stable deviation index δ, and failure threshold value is about 2 to 3 times of the stable deviation index.

12. An apparatus for detecting performance of an APU starter, comprises:
a processor; and
a memory coupled to the processor, which stores computer readable instructions;
the computer readable instructions run on the processor to execute the following steps:
rotating the APU with a starter system;
obtaining APU-related messages within a predetermined time period;
parsing out running parameters of the APU starter according to the messages, the running parameters comprise starting times (STAs);
determining whether performance of the APU starter is in a stable phase, decline phase, serious decline phase or failure phase, the determining comprising:
in response to that the deviation index δ of the STAs within the predetermined time period is less than a decline threshold value, determining that performance of the APU starter is in the stable phase
in response to that the deviation index δ of the STAs within the predetermined time period is greater than the decline threshold value and less than a failure threshold value, determining that performance of the APU starter is in the decline phase and
in response to that the deviation index δ of the STAs within the predetermined time period is greater than the failure threshold value, determining that performance of the APU starter is in the failure phase, and
wherein, the deviation index δ is determined when the APU starter is in a stable phase; and
the decline threshold value is about 1.5 to 2.0 times of the stable deviation index δ, and failure threshold value is about 2 to 3 times of the stable deviation index δ.

* * * * *